United States Patent
Wong et al.

(10) Patent No.: US 7,739,943 B2
(45) Date of Patent: Jun. 22, 2010

(54) VEHICULAR HYDRAULIC SYSTEM WITH PRESSURE DUMP AND RELIEF VALVE ARRANGEMENT

(75) Inventors: Albert C. Wong, Saginaw, MI (US); James L. Davison, Freeland, MI (US); Rick L. Lincoln, Linwood, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 307 days.

(21) Appl. No.: 11/901,865

(22) Filed: Sep. 19, 2007

(65) Prior Publication Data

US 2008/0066464 A1   Mar. 20, 2008

Related U.S. Application Data

(60) Provisional application No. 60/845,898, filed on Sep. 20, 2006.

(51) Int. Cl.
   *F15B 13/06* (2006.01)
(52) U.S. Cl. .......................................... 91/516
(58) Field of Classification Search ................ 91/516
   See application file for complete search history.

(56) References Cited

U.S. PATENT DOCUMENTS

| | | |
|---|---|---|
| 3,050,944 A | 8/1962 | Schwartz et al. |
| 3,633,363 A | 1/1972 | Larsen |
| 3,662,548 A | 5/1972 | Suzuki et al. |
| 3,785,393 A | 1/1974 | Tanguy |
| 3,879,948 A | 4/1975 | Flory |
| 3,915,186 A | 10/1975 | Thomas |
| 3,941,142 A | 3/1976 | Adachi et al. |
| 4,070,858 A | 1/1978 | Hand |
| 4,074,528 A | 2/1978 | Lourigan et al. |
| 4,075,840 A | 2/1978 | Jesswein |
| 4,139,988 A | 2/1979 | Adachi |
| 4,161,867 A | 7/1979 | Adachi |
| 4,174,018 A | 11/1979 | Liebert et al. |
| 4,181,371 A | 1/1980 | Adachi |
| 4,251,193 A | 2/1981 | Minnis et al. |
| 4,253,382 A | 3/1981 | Yip |
| 4,414,809 A | 11/1983 | Burris |
| 4,420,934 A | 12/1983 | Udono |
| 4,620,750 A | 11/1986 | Leiber |
| 4,967,643 A | 11/1990 | Siegel |
| 5,385,455 A | 1/1995 | Dinsmore et al. |
| 5,471,838 A | 12/1995 | Suzuki et al. |

(Continued)

*Primary Examiner*—F. Daniel Lopez
(74) *Attorney, Agent, or Firm*—Cantor Colburn LLP

(57) ABSTRACT

A vehicular hydraulic system having a pump, first application, pressure-dump valve and second application arranged in series. The pressure-dump valve diverts a portion of the primary fluid flow past the second application when the pressure exceeds a threshold value. A valve member in the pressure-dump valve defines a pressure-reducing orifice that communicates fluid across the valve member. A check valve prevents flow through the pressure-reducing orifice when the pressure in the valve is below the threshold value. When the pressure exceeds the threshold value, fluid flows through check valve and the pressure reducing orifice resulting in the movement of the valve member and exposure of a bypass port thereby diverting a portion of the primary fluid flow past the second application. The check valve may be selectively variable to provide for the adjustment of the threshold value. A priority valve may also be provided upstream of the first application.

19 Claims, 3 Drawing Sheets

U.S. PATENT DOCUMENTS

| | | |
|---|---|---|
| 5,535,845 A | 7/1996 | Buschur |
| 5,651,665 A | 7/1997 | Can et al. |
| 5,802,848 A | 9/1998 | McClendon et al. |
| 5,881,630 A | 3/1999 | Buschur et al. |
| 5,960,628 A | 10/1999 | Machesney et al. |
| 6,016,657 A | 1/2000 | Buschur |
| 6,343,469 B1 | 2/2002 | Penninger et al. |
| 6,814,413 B2 | 11/2004 | Davison et al. |
| 6,959,639 B2 * | 11/2005 | Nagumo et al. ............... 91/516 |
| 7,155,907 B2 | 1/2007 | Desjardins et al. |

* cited by examiner

VEHICULAR HYDRAULIC SYSTEM WITH PRESSURE DUMP AND RELIEF VALVE ARRANGEMENT

CROSS REFERENCE TO RELATED APPLICATIONS

This application claims priority under 35 U.S.C. 119(e) of U.S. provisional patent application Ser. No. 60/845,898 filed on Sep. 20, 2006 entitled VEHICULAR HYDRAULIC SYSTEM WITH PRIORITY VALVE AND PRESSURE DUMP AND RELIEF VALVE ARRANGEMENT the disclosure of which is hereby incorporated herein by reference.

BACKGROUND OF THE INVENTION

1. Field of the Invention

The present invention relates to hydraulic systems for vehicles and, more particularly, to a hydraulic system having a hydraulic fluid pump and at least one hydraulic application.

2. Description of the Related Art

Many trucks with hydraulic braking systems, particularly larger gasoline powered and diesel powered trucks, incorporate hydraulic braking assist systems, rather than vacuum assist systems commonly found in passenger automobiles. The use of vacuum assist braking systems can be problematic in vehicles having a turbo-charged engine and such vehicles will also often employ hydraulic braking assist systems. Furthermore, there is an aftermarket demand for hydraulic braking assist systems for vehicles, such as hotrods, that may not otherwise have a brake assist device or for which the use of a vacuum assist system presents difficulties. Such hydraulic braking assist systems are well known and sold commercially.

Typically, these hydraulic braking assist systems are connected in series between the steering gear and hydraulic pump and use flow from the pump to generate the necessary pressure to provide brake assist as needed. The flow from the pump is generally confined within a narrow range of flow rates and is not intentionally varied to meet changing vehicle operating conditions. Because of the series arrangement, the application of the brakes and engagement of the hydraulic braking assist system can affect the flow of hydraulic fluid to the steering gear, thereby affecting the amount of assist available to the steering gear. Specifically, when a heavy braking load is applied, it causes an increase in backpressure to the pump which can exceed a threshold relief pressure (e.g., 1,500 psi) of the pump. Above this level, a bypass valve of the pump opens to divert a fraction of the outflow back to the intake of the pump, where the cycle continues until the pressure from the brake assist device drops below the threshold value of the bypass valve. During this relief condition, a diminished flow of fluid is sent to the steering gear which may result in a detectable increase in steering effort by the operator of the vehicle to turn the steering wheel under extreme relief conditions.

To at least partially alleviate this condition, it is possible to place a flow-splitter or priority valve in the hydraulic system to divert a portion of the flow of fluid being discharged from the pump to the steering gear under heavy braking conditions. The disclosure of U.S. Pat. No. 6,814,413 B2 describes the use of such a flow-splitter and is hereby incorporated herein by reference. While the use of a flow splitter to divert a portion of the fluid flow being discharged by the pump to the steering gear assist device during heavy braking conditions provides significant advantages, the use of such a flow splitter generally requires that the steering gear device have a pressure relief value that is at least large as the pressure relief value of the brake assist device.

Oftentimes, a steering gear assist device that is adequate for a particular vehicle will have a lower pressure relief value than the brake assist device required for that same vehicle. Thus, the requirement that the steering gear assist device have a pressure relief value that is at least as large as the pressure relief value of the brake assist device often has a direct impact on the selection of a steering gear assist device and results in the selection of a more expensive steering gear assist device.

SUMMARY OF THE INVENTION

The invention provides a pressure dump and relief valve arrangement that can be used to limit the pressure at the inlet of a hydraulic application in a vehicular hydraulic system.

The invention comprises, in one form thereof, a vehicular hydraulic system with a hydraulic circuit having, arranged in series and in serial order along a primary flow path, a hydraulic pump, a pressure dump valve and a hydraulic application. The pressure-dump valve has a valve body and a valve member. The valve body defines a valve chamber having an axis. The valve member is axially slidable within the chamber between a first axial position and a second axial position and partitions the chamber into a primary flow channel and a secondary volume. The valve member also defines a pressure-reducing orifice providing fluid communication between the primary flow channel and the secondary volume. The valve body defines an inlet port in fluid communication with the primary flow channel, an outlet port in fluid communication with the primary flow channel, a secondary volume port in fluid communication with the secondary volume, and a bypass port. The bypass port is disposed at an axially intermediate position with the secondary volume port being disposed on one axial side of the bypass port and the inlet port and the outlet port being disposed on the opposing axial side of the bypass port. The bypass port is sealed from fluid communication with the valve chamber when the valve member is in the first axial position. The bypass port is in fluid communication with the primary flow channel when the valve member is in the second axial position. The pressure-dump valve is operably disposed in the hydraulic circuit wherein the primary flow path extends to the inlet port, through the primary flow channel and the outlet port to the second hydraulic application. The bypass port is in fluid communication with the primary flow path at a point downstream of the hydraulic application and upstream of the pump. A biasing member is operably coupled with the valve member and biases the valve member toward the first position. A one-way check valve is operably disposed in the hydraulic circuit between the secondary volume port and the primary flow channel at a location downstream of the hydraulic application and upstream of the pump. The check valve allows fluid flow from the secondary volume port to the primary flow path when a pressure in the primary flow channel communicated to the secondary volume through the pressure-reducing orifice exceeds a threshold pressure value. When the check valve permits fluid flow therethrough, fluid flowing from the primary flow channel to the secondary volume through the pressure-reducing orifice experiences a reduction in pressure thereby producing a pressure differential between the secondary volume and the primary flow channel, the pressure differential biasing the valve member from the first axial position to the second axial position. When the check valve closes and terminates fluid flow therethrough, the pressure differential decreases and the biasing member biases the valve member to the first axial position.

Some embodiments of the invention may have a one-way check valve that defines a selectively variable resistance to opening of the check valve to fluid flow therethrough whereby the threshold pressure value defined by the check valve is adjustable. For some such selectively variable check valves, the valves may externally adjustable.

Other embodiments of the invention may include a priority or flow-splitting valve located in the hydraulic circuit between the pump and the first hydraulic application wherein in a first operating condition, substantially all of the hydraulic fluid discharged from the pump is circulated along the primary flow path through the flow-splitting valve to the first hydraulic application. When the fluid in the primary flow path upstream of the first hydraulic application is elevated to a first threshold value, the flow-splitting valve splits the hydraulic fluid discharged by the pump into a first fluid flow which is communicated to the primary flow path upstream of the first hydraulic application and a second fluid flow which is communicated to a point in the primary flow path downstream of the first hydraulic application and upstream of the pressure-dump valve. In yet other embodiments, the first threshold value defined by the flow-splitting valve is greater than the threshold value defined by the pressure-dump valve.

In still other embodiments of the invention, the first hydraulic application may take the form of a hydraulic brake booster device and the second hydraulic application may take the form of a hydraulic steering gear device.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
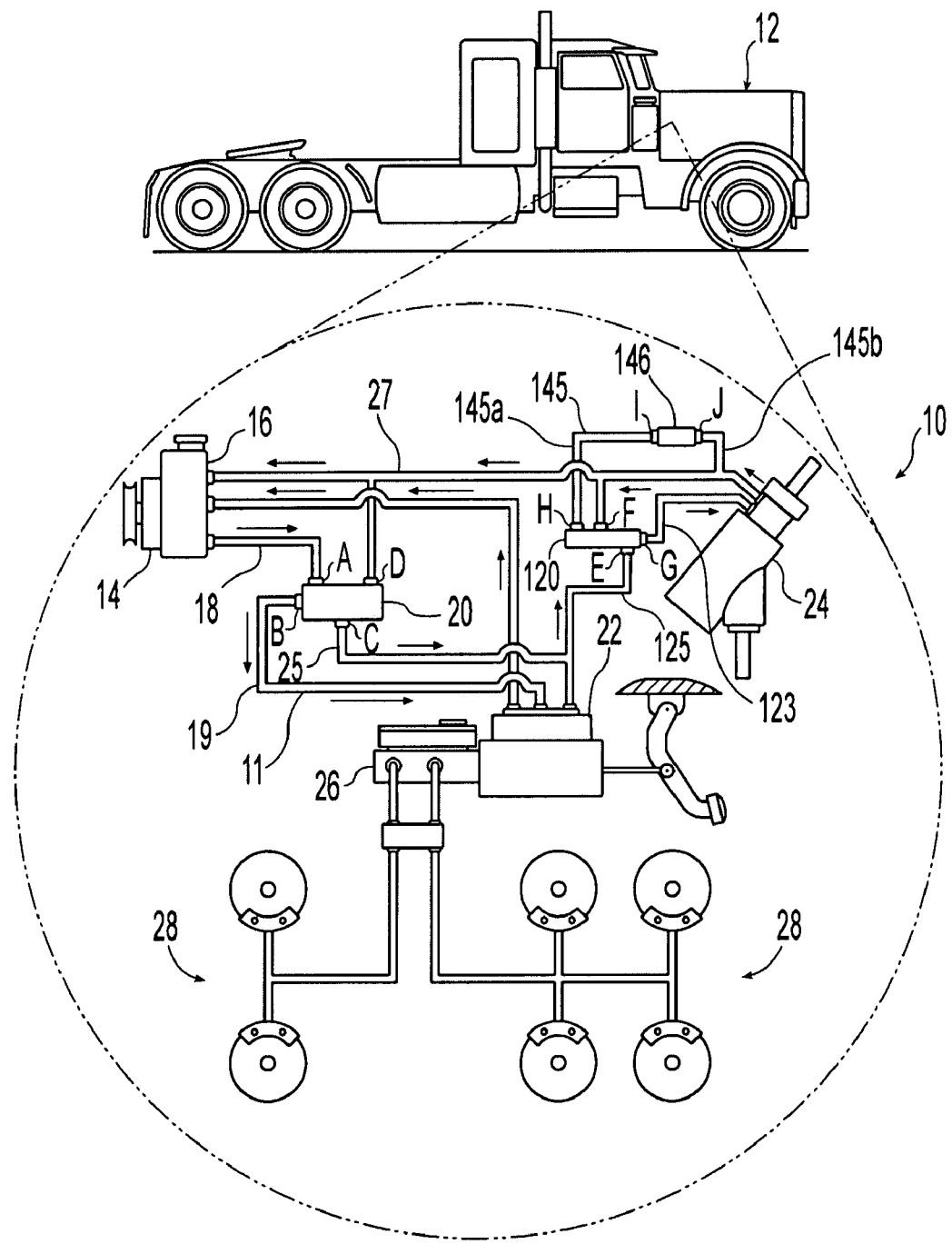
FIG. 1 is a schematic view of a hydraulic system in accordance with the present invention.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

FIG. 1 shows a hydraulic system 10 for a vehicle 12 for assisting in the steering and braking of the vehicle. The hydraulic system includes a hydraulic pump 14 and reservoir 16. The reservoir may be incorporated into the pump 14, as illustrated, or may be located remote from the pump 14.

The pump 14 delivers high pressure hydraulic fluid through discharge line 18 to a flow splitting valve 20 also referred to as a priority valve. The priority valve 20, in turn, selectively communicates with a first hydraulic application 22, a second hydraulic application 24, and the reservoir 16, depending on predetermined operating conditions of the system 10, as will be explained below.

The first and second hydraulic applications 22, 24 take the form of a hydraulic device or hydraulic sub-circuit. In the illustrated embodiment, first application 22 is a hydraulic braking assist system or booster device, and the second application 24 is a hydraulic steering gear assist system or device.

The hydraulic brake assist 22 communicates with a master cylinder 26 and brakes 28 of the braking system. Hydraulic booster device 22 is of a type well known in the art which is disposed in line between the hydraulic pump and the hydraulic master cylinder of a vehicular hydraulic brake system which acts to boost or amplify the force to the brake system in order to reduce brake pedal effort and pedal travel required to apply the brakes as compared with a manual braking system. Such systems are disclosed, for example, in U.S. Pat. Nos. 4,620,750 and 4,967,643, the disclosures of which are both incorporated herein by reference, and provide examples of a suitable booster device 22. Briefly, hydraulic fluid from the supply pump 14 is communicated to the booster device 22 through a booster inlet port and is directed through an open center spool valve slideable in a booster cavity (not shown). A power piston slides within an adjacent cylinder and is exposed to a fluid pressure on an input side of the piston and coupled to an output rod on the opposite side. An input reaction rod connected to the brake pedal extends into the housing and is linked to the spool valve via input levers or links. Movement of the input rod moves the spool valve, creating a restriction to the fluid flow and corresponding boost in pressure applied to the power piston. Steering pressure created by the steering gear assist system 24 is isolated from the boost cavity by the spool valve and does not affect braking but does create a steering assist backpressure to the pump 14. The priority valve 20 operates to manage the flow of hydraulic fluid from the pump 14 to each of the brake assist 22 and steering assist 24 systems in a manner that reduces the interdependence of the steering and braking systems on one another for operation.

Figure 2:
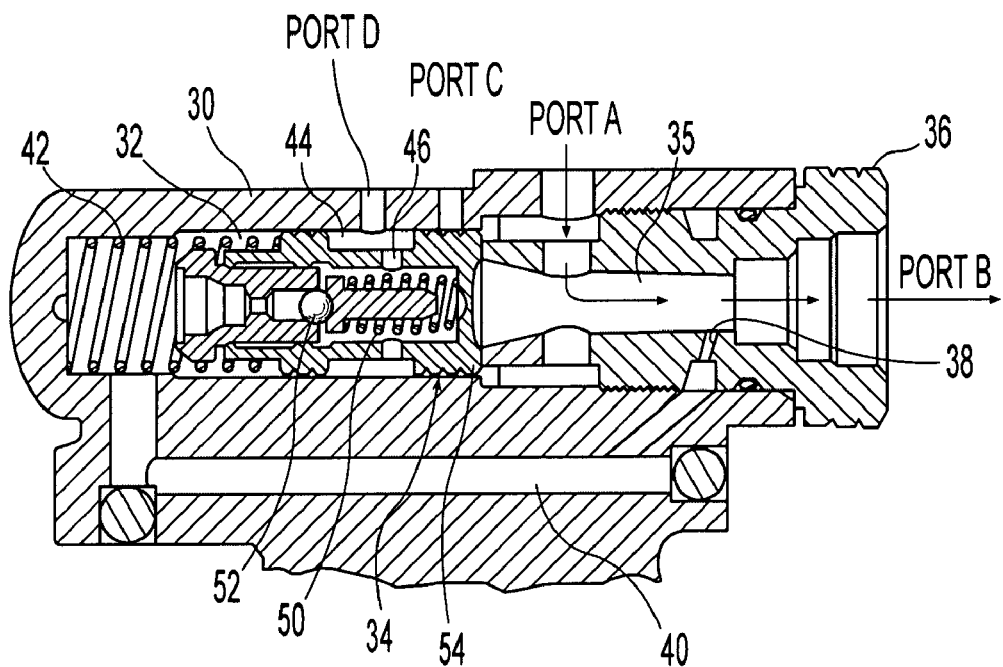
FIG. 2 is a partial cross sectional view of a priority valve under normal flow conditions.
Figure 3:
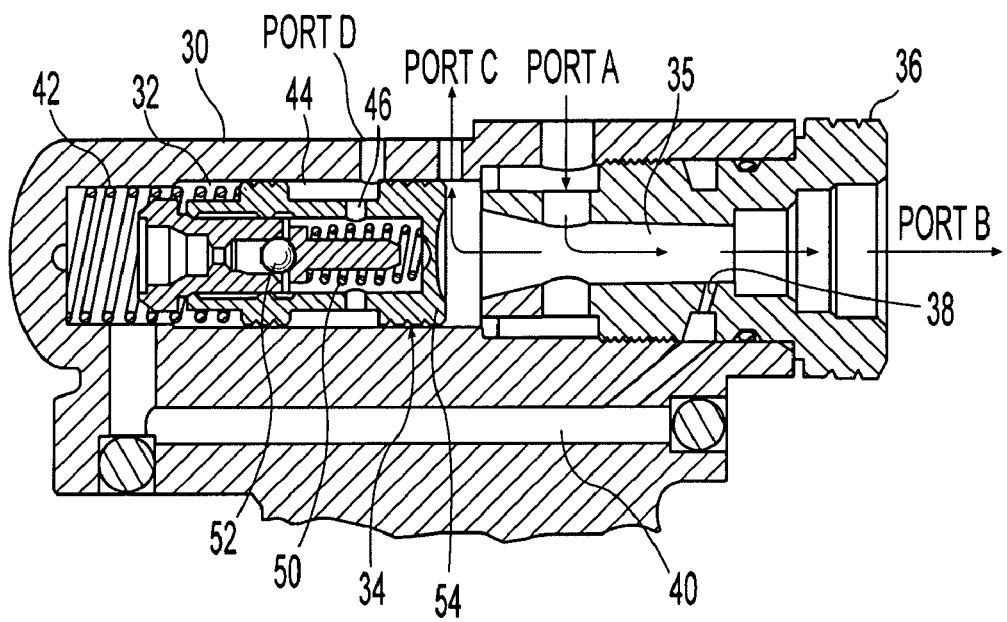
FIG. 3 is a partial cross sectional view of the priority valve of FIG. 2 wherein the priority valve is diverting a portion of the fluid flow through port C.

With reference to FIGS. 2 and 3, priority valve 20 includes a valve body 30 having a valve bore forming a chamber 32 in which a slideable flow control valve member 34 is accommodated. A plurality of ports are provided in the valve body 30, and are denoted in the drawing Figures as ports A, B, C and D. Fluid from the pump 14 is directed into the valve body 30 through port A, where it enters the chamber 32 and is directed out of the body 30 through one or more of the outlet ports B, C and D, depending upon the operating conditions which will now be described.

FIG. 2 shows normal operation of priority valve 20 under conditions where backpressure from the brake assist device 22 is below a predetermined threshold or control pressure. All of the flow entering port A passes through a primary channel 35 of the bore 32 of the flow splitter 20 and is routed through port B to the hydraulic brake booster 22. Of course, for all real devices, there is some inherent loss of fluid due to clearances between individual parts.

In the condition illustrated in FIG. 2, brake assist 22 is operating below the predetermined threshold or relief pressure value and the fluid flows freely into Port A and out Port B through the channel 35. As shown, the valve body 30 may be fitted with a union fitting 36 which extends into valve bore 32 and is formed with primary channel 35 in direct flow communication with valve bore 32. The line pressure in the primary channel 35 is communicated through a pressure reducing or P-hole orifice 38 in union fitting 36 and a communication passage 40 in the valve body 30 to the back of the flow control valve 34. This pressure, along with the bias exerted by a flow control spring 42 holds valve member 34 forward against union fitting 36. In this position, valve member 34 completely covers the bypass ports C, D to the steering assist 24 and reservoir 16, respectively, such that flow neither enters nor leaves these two ports. The valve member 34 has a reservoir pressure communication groove 44 that is always exposed to Port D and thus to the reservoir pressure regardless of the position of valve member 34. This reservoir pressure is communicated to the inside of the valve through opening 46. A small poppet valve 50 separates the fluid at line pressure behind the valve member 34 from the fluid at the reservoir pressure inside valve member 34.

Turning now to FIG. 3, the condition is shown where the brake assist pressure developed by brake assist device 22 within Port B and the primary channel 35 exceeds the predetermined threshold pressure value for brake assist device 22, which is preferably set just below the relief pressure of pump 14. As the backpressure in primary channel 35 approaches the predetermined control pressure, the fluid pressure communicated to the back side of flow control valve member 34 will unseat a poppet ball 52 of poppet valve 50 which will cause some of the hydraulic oil to bleed behind the plunger 54 of valve member 34 and out to reservoir 16 through opening 46 in valve member 34 and Port D. Since P-hole orifice 38 is quite small, the communication passage pressure 40 will be lower than the line pressure within the primary channel 35 as long as the poppet valve 50 is open and bleeding oil from behind plunger 54. This pressure differential will cause plunger 54 to slide back against spring 42 from the position shown in FIG. 2 to the position shown in FIG. 3, thereby exposing Port C to the main flow of fluid discharged by pump 14 coming in through Port A. The flow from pump 14 in through Port A will thus be fed to both Port B and Port C with a significant majority of the flow being discharged through Port C bypassing the brake assist device 22 and being delivered to steering gear assist device 24 through hydraulic line 25. The flow control valve 34 thus operates to automatically meter excess oil flow through Port C when the backpressure generated by the brake assist device 22 rises to the preset control pressure which, as mentioned, is preferably set just under the relief pressure of the pump 14.

Priority valves having a different construction that divert hydraulic fluid flow such that the diverted fluid bypasses brake assist device 22 and is delivered to steering gear assist device 24 may also be employed with the present invention. For example, priority valves having a simplified construction that can be substituted for the illustrated priority valve 20 are described by Wong et al. in U.S. Utility patent application Ser. No. 11/901,821 entitled VEHICULAR HYDRAULIC SYSTEM WITH PRIORITY VALVE AND RELIEF VALVE and claiming priority from U.S. Provisional Application Ser. No. 60/845,911 filed Sep. 20, 2006; and by Wong et al. in U.S. Utility patent application Ser. No. 11/901,822 entitled VEHICULAR HYDRAULIC SYSTEM WITH PRIORITY VALVE and claiming priority from U.S. Provisional Application Ser. No. 60/845,892 filed Sep. 20, 2006, both of these utility patent applications having a common filing date with the present application, and wherein both of the utility applications and both of the provisional applications are assigned to the assignee of the present application and wherein each of these four utility and provisional applications are expressly incorporated herein by reference.

Figure 4:
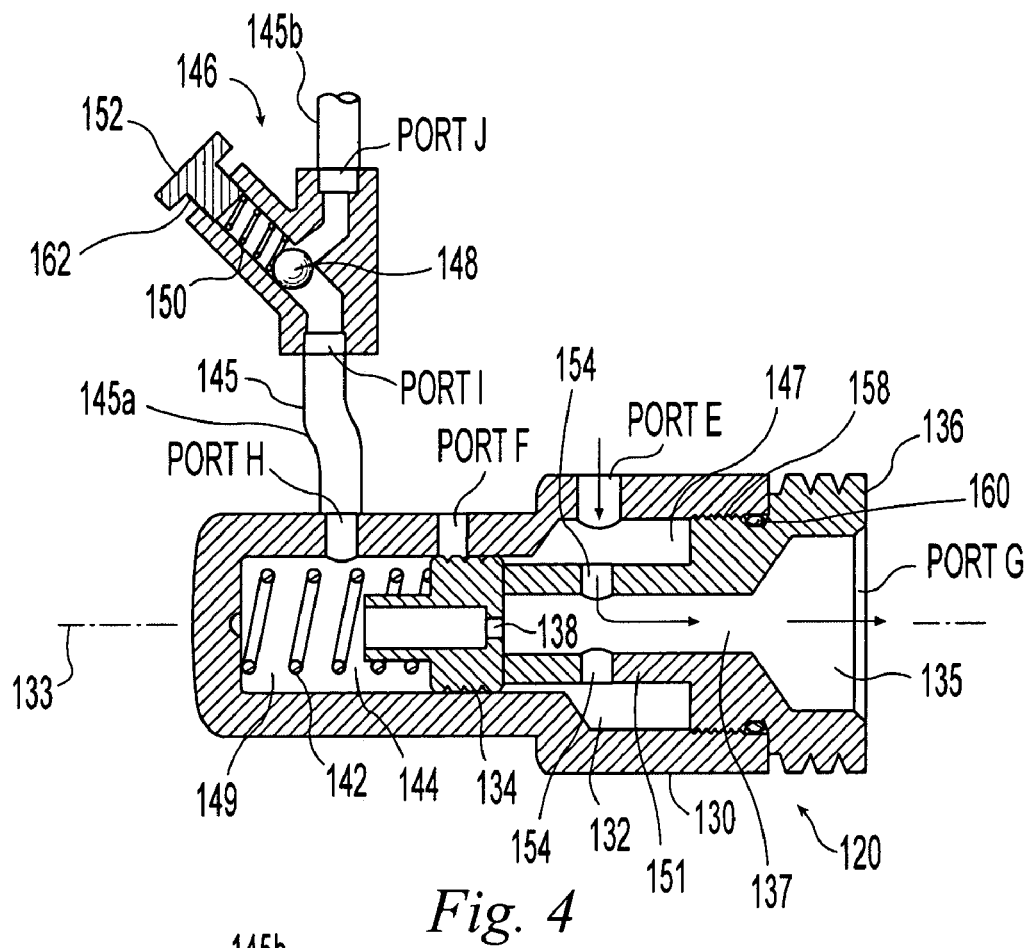
FIG. 4 is a schematic partial cross sectional view of a pressure dump and relief valve arrangement under low pressure conditions.
Figure 5:
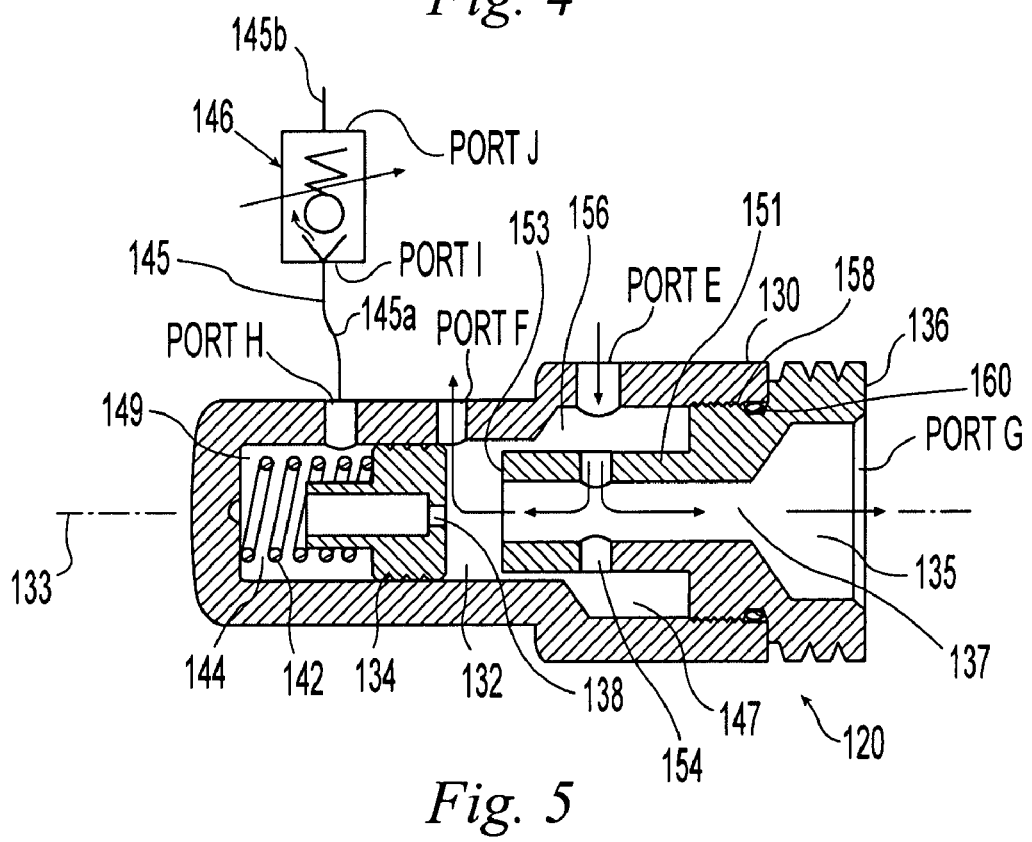
FIG. 5 is a schematic partial cross sectional view of the valve arrangement illustrated in FIG. 4 under high pressure conditions.

Hydraulic system 10 also includes a pilot operated pressure dump valve 120 and a relief valve 146 that are arranged to limit the maximum pressure of the hydraulic fluid that is conveyed to steering gear assist device 24. With reference to FIGS. 4 and 5, pressure dump valve 120 includes a valve body 130 having a bore forming valve chamber 132 in which a slideable flow control valve member 134 is accommodated. A plurality of ports are provided in the valve body 130, and are denoted in the Figures as Ports E (inlet port), F (bypass port), G (outlet port) and H (secondary volume port). Fluid from the outlet of brake assist device 22 and from Port C of priority valve 20 is directed into the valve body 130 through inlet Port E, where it enters the chamber 132 and is directed out of the body 130 through one or more of Ports F, G and H, depending upon the operating conditions which will now be described.

FIG. 4 shows valve 120 under low pressure conditions where the pressure at the inlet of steering gear assist device 24 is below a second predetermined threshold pressure. In the illustrated embodiment, the pressure within primary channel 135 and at Ports E and G will be substantially the same as the pressure at the inlet to steering gear assist device 24. In the condition illustrated in FIG. 4, all of the flow entering Port E passes through primary channel 135 of the bore 132 and is routed through port G to the hydraulic steering gear assist device 24. Such low pressure conditions may exist when there is not a significant load on steering gear assist device 24.

As shown, valve body 130 may be fitted with a union fitting 136 which extends into the valve chamber 132. Primary channel 135 extends through union fitting 136. Elongate valve chamber 132 has two cylindrical sections coaxially aligned along axis 133 with a first cylindrical section 147 having a larger diameter than second cylindrical section 149. In the illustrated embodiment, union fitting 136 includes threads 158 engaged with corresponding threads in large cylindrical section 147 of valve chamber 132 and an O-ring 160 to provide a seal. Union fitting 136 also includes a hollow tubular portion 151 with an open end 153 that extends into valve chamber 132. Tubular portion 151 has a smaller outer diameter than the inner diameter of cylindrical section 147 of chamber 132 whereby an interstitial space 156 is defined within valve chamber 132 between tubular portion 151 and valve body 130. Tubular portion 151 also includes sidewall openings 154 which provide fluid communication between interstitial space 156 and the interior 137 of union fitting 136. Inlet port E is in fluid communication with interstitial space 156 while outlet port G is in fluid communication with interior 137 of fitting 136. Thus, the primary flow channel 135 through valve 120 from port E to port G is defined, in the illustrated embodiment, by interstitial space 156, sidewall openings 154 and interior volume 137 of fitting 136.

Valve member 134 includes a pressure reducing orifice 138 that provides fluid communication between primary channel 135 and the secondary volume 144 of valve chamber 132 located rearwardly of valve member 134. In the low pressure condition illustrated in FIG. 4, secondary volume 144 is in communication with Port H and valve member 134 seals Port F from fluid communication with valve chamber 132 preventing fluid communication between Port F and both rear volume 144 and primary channel 135.

A relief valve 146 is disposed in a hydraulic line 145 extending from secondary Port H to hydraulic line 27 at a location downstream of steering gear device 24 and upstream of pump 14. Relief valve 146 is spaced from Port H by a first portion 145a of line 145 while a second portion 145b of line 145 extends from valve 146 to line 27. Relief valve 146 has an inlet port, Port I, that is in fluid communication with Port H through hydraulic line portion 45a. Relief valve 146 has a discharge port, Port J, that is in communication with reservoir 16 through line portion 45b and line 27. In the illustrated embodiment, reservoir 16 is disposed downstream of steering gear 24 and upstream of pump 14 and holds hydraulic fluid at a relatively low pressure. The fluid pressure within hydraulic reservoir 16 is communicated to discharge port J through fluid lines 27 and 45b. Relief valve 146 prevents the flow of fluid from Port J to Port I and allows the flow of fluid from Port I to Port J when the fluid pressure within secondary volume 144 overcomes the threshold pressure value of relief valve 146 as discussed in greater detail below.

Under low pressure conditions, relief valve 146 is closed and prevents the flow of fluid from Port I to Port J. As mentioned above, secondary volume 144 is in fluid communication with primary channel 135 through orifice 138. When relief valve 146 is closed and fluid is not actively flowing through orifice 138, the pressure in secondary volume 144 will be the same as the pressure of fluid in primary channel 135. Consequently, in the low pressure condition depicted in FIG. 4, the fluid pressure in secondary volume 144 is the same as the fluid pressure in primary channel 135. Under these low pressure conditions, biasing member 142, which takes the form of a helical spring in the illustrated embodiment, holds valve member 134 forward against the union fitting 136. In this position, the valve 134 prevents fluid entering through Port E from leaving through bypass Port F to reservoir 16 while relief valve 146 prevents the discharge of fluid through Port H to reservoir 16. Consequently, when valve 134 is in the position shown in FIG. 4, all of the fluid entering Port E is discharged through Port G and fluid neither enters nor is discharged through either of Ports F or H. Of course, for all real devices, there is some inherent loss of fluid due to clearances between individual parts.

Turning now to FIG. 5, a high pressure relief condition is shown where the pressure developed by the steering gear assist device 24 within primary channel 135 and Ports G and E exceeds the threshold pressure value of relief valve 146. (The hydraulic fluid in primary channel 135 is exposed to valve member 134 through the open end 153 of union fitting 136 when valve member 134 is in the axial position shown in FIG. 4.) As the pressure in primary channel 135 approaches the threshold pressure, this pressure increase causes relief valve 146 to open allowing fluid flow through orifice 138, secondary volume 144, Port H, fluid line 145a, Port I, relief valve 146, Port J and fluid line 145b. This fluid flow is returned to reservoir 16 through fluid line 27 and is a relatively small portion of the total fluid flow through primary channel 135. When relief valve 146 opens and allows this fluid flow to occur, the fluid will experience a pressure drop as it flows through orifice 138.

Orifice 138 has a small cross-sectional area relative to valve sections 147, 149 and fluid flowing through orifice 138 experiences an increase in velocity within orifice 138 followed by a decrease in velocity in valve section 49 which is accompanied by a reduction in the pressure of the fluid. This use of an orifice having a relatively small cross-sectional area to reduce the pressure of hydraulic fluid actively flowing therethrough is well-known to those having ordinary skill in the art. Consequently, the fluid in secondary volume 144 will be at a lower pressure than the fluid in primary channel 135. This drop in pressure in secondary volume 144 creates a pressure differential between the secondary volume 144 and primary flow channel 135 which allows the higher pressure fluid in primary channel 135 to overcome the biasing force of spring 142 and push valve member 134 rearwards from the first axial position shown in FIG. 4 to the second axial position shown in FIG. 5. In the second axial position shown in FIG. 5, valve member 134 is spaced from open end 153 of tubular portion 151 and has moved axially to expose bypass Port F to the main flow of fluid coming in through Port E. The flow entering valve 120 through Port E will thus be fed to both Port G and Port F with a significant majority of the flow being diverted to reservoir 16 through Port F and thereby limiting the pressure of the fluid at Port G. The flow control valve member 134 in combination with relief valve 146 thus operates to automatically meter excess oil flow through the bypass Port F to prevent the line pressure to steering gear assist device 24 from rising above the preset threshold pressure (i.e., the pressure at which pressure relief valve 146 is opened).

When the backpressure generated by steering gear assist device 24 at Port G and within primary channel 135 falls to the point at which relief valve 146 once again closes, the fluid flow through orifice 138 will be cut off and the fluid pressure in rear volume 144 will equalize to the fluid pressure in primary channel 135. As a result, spring 142 will once again bias valve member 134 forward and thereby cut off the fluid flow through Port F and return valve 120 to the low pressure condition illustrated in FIG. 4.

The use of pressure dump valve 120 and relief valve 146 enables the use of a steering gear device 24 that has a pressure relief value that is less than that of the brake assist device 22. In a hydraulic circuit having a steering gear device with a pressure relief value less than that of the brake assist device, pressure dump valve 120 and relief valve 146 will operate to prevent the pressure of hydraulic fluid at the inlet to steering gear assist device 24 from exceeding the pressure limit value of steering gear assist device 24 while priority valve 20 operates to prevent the pressure of hydraulic fluid at the inlet to brake assist device 22 from exceeding the pressure limit value of braking assist device 24. By setting the pressure value at which priority valve 20 relieves pressure at the inlet to brake assist device 22 higher than the value at which pressure dump valve 120 and relief valve 146 relieve pressure at the inlet to steering gear assist device 24, a brake assist device 22 can be used together with a steering gear assist device 24 in hydraulic circuit 10 wherein the steering gear assist device 24 has a lower pressure limit value than that of the brake assist device 22.

It is noted that while valve chamber 132 is shown as a blind bore, valve chamber 132 may be a through bore in alternative embodiments. For example, the end of valve chamber 132 engaged with spring 142 could be a formed by a threaded plug which is axially adjustable whereby the force exerted by spring 142 could be adjusted by rotating the threaded plug and adjusting its axial position with valve bore 132.

In FIGS. 4 and 5, relief valve 146 is shown as an adjustable relief valve, however, in alternative embodiments of the present invention relief valve 146 may be non-adjustable or utilize alternative forms of an adjustable relief valve. Relief valve 146 is shown in a more schematic form in FIG. 5 than in FIG. 4.

FIG. 4 illustrates the structure of one embodiment of relief valve 146. In the illustrated embodiment, valve 146 includes a ball valve member 148 which is biased into a closed position by a biasing member 150 taking the form of a helical spring. In FIG. 4, valve member 148 is in a first position wherein it closes valve 146 and prevents fluid flow therethrough while in FIG. 3, valve member 148 has been biased away from its valve seat into a second open position which permits the flow of fluid through valve 46. Spring 150 is operably coupled with threaded plug 152 with spring 150 engaging plug 152 on its end opposite ball 148 and biases ball 148 towards its first or closed position shown in FIG. 4. Plug 152 has helical threads 162 engaged with cooperating threads on the body of valve

146. By adjusting the position of plug 152 the biasing force exerted by spring 150 on ball 148, and consequently, the fluid pressure required to open valve 146 can be externally adjusted thereby permitting the external adjustment of the control pressure at which the fluid pressure at the inlet of steering gear assist device 24 is relieved. In other words, valve 146 defines a selectively variable resistance to the opening of valve 146 which is determined by the differential between the fluid pressure at ports E (inlet port of valve 146) and F (discharge port of valve 146) and biasing force of spring 150. By repositioning threaded plug 152, the biasing force exerted by spring 150 is adjusted and, consequently, the resistance to the opening of valve 146 and the threshold pressure at which valve 20 diverts fluid through bypass port C is also adjusted.

As evident from the description presented above, hydraulic circuit 10 includes, in series arrangement and in serial order, hydraulic pump 14, priority valve 20, brake booster device 22, pressure dump valve 120, steering gear device 24 and reservoir 16. When valve 20 is not diverting a portion of the fluid flow through port C to bypass brake booster device 22 as occurs when brake booster 22 is generating a relatively high back pressure, a substantial majority of the fluid flow discharged from pump 14 will flow along a primary flow path 11 that extends from the outlet of pump 14, through discharge line 18, through valve 20 from port A to port B along primary flow channel 35, through hydraulic line 19 to brake booster 22 and through hydraulic line 125 to pressure dump valve 120. When valve 120 is not dumping high pressure fluid through port F, as occurs when steering gear device 24 is generating a relatively high back pressure, a substantial majority of the fluid flow in line 125 will continue to flow along primary flow path 11 which further extends through valve 120 from port E to port G along primary flow channel 135, through hydraulic line 123 to steering gear 24, through hydraulic line 27 to reservoir 16 and then to the inlet of pump 14 wherein the cycle is repeated. As described above, when the pressure upstream of brake booster 22 is elevated to a first threshold value, valve 20 will split the fluid flow at valve 20 with a portion being communicated to port B in the primary flow path upstream of brake booster 22 and another portion of the fluid flow being diverted through bypass port C to hydraulic line 25 which communicates the fluid to a point in the primary flow path downstream of brake booster 22 and upstream of pressure-dump valve 120 (and steering gear device 24) in hydraulic line 125. Similarly, when the pressure upstream of steering gear 24 is elevated to a second threshold value, valve 120 will split the fluid flow at valve 120 with a portion being communicated to port G in the primary flow path upstream of steering gear 24 and another portion of the fluid flow being diverted through bypass port F to a point in the primary flow path 11 downstream of steering gear 24 and upstream of pump 14. A relatively minor quantity of fluid will also flow through port H, line 145a, relief valve 146, line 145b to line 27 when valve 120 is diverting fluid through bypass port F.

While the present invention has been described above with reference to a hydraulic system that combines both a steering gear assist device and a brake assist device, it may also be employed with other hydraulic applications. For example, it is known to employ a single hydraulic fluid pump to power the fluid motor of a steering assist device and a second fluid motor associated with a radiator cooling fan. U.S. Pat. No. 5,802,848, for example, discloses a system having a steering gear assist device and a radiator cooling fan with a fluid motor powered by a single hydraulic fluid pump and is incorporated herein by reference. In alternative embodiments of the present invention, the priority valve and pressure dump and relief valve arrangement disclosed herein could be employed to facilitate the use of a single hydraulic fluid pump to power the fluid motors of both a steering gear assist device and that of a radiator cooling fan.

Furthermore, the priority valve and pressure dump and relief valve arrangement of the present system could be used to control the fluid flow associated with two hydraulic devices (e.g., a brake assist device, a steering gear assist device, a radiator fan having a fluid motor, or other hydraulic device), or two hydraulic circuits, wherein the priority valve and pressure dump and relief valve arrangement and the two associated hydraulic devices or circuits, form one portion of a larger complex hydraulic circuit.

In still other embodiments, a pressure dump and relief valve arrangement as described herein could be used in a hydraulic circuit without a priority valve. For example, a pressure dump and relief valve arrangement as described herein could be used in an integrated hydraulic circuit having both a brake assist device and a steering gear assist device but not a priority valve. In such a circuit, the pressure dump and relief valve arrangement could enable the use of a steering gear assist device having a lower pressure relief value than that of the brake assist device or simply to relieve the pressure of the hydraulic fluid at the inlet of the steering gear device when it exceeded a predetermined value. Additionally, a pressure dump and relief valve arrangement as described herein, could be employed in a conventional hydraulic circuit for a steering gear assist device that does not include any other hydraulic devices to limit the pressure of the hydraulic fluid at the inlet of the steering gear assist device.

It is also possible for pressure dump valve 120 and relief valve 146 to be used in a hydraulic circuit having a reservoir disposed near pump 14 and a remote reservoir or sump disposed near valves 120, 146. This use of dual reservoirs would not only position a pool of hydraulic fluid near both pump 14 and valves 120, 146 but could also be used to increase the overall quantity of hydraulic fluid in the hydraulic circuit and thereby increase the heat sink capacity of the hydraulic fluid within the circuit.

While this invention has been described as having an exemplary design, the present invention may be further modified within the spirit and scope of this disclosure. This application is therefore intended to cover any variations, uses, or adaptations of the invention using its general principles.

What is claimed is:

1. A vehicular hydraulic system comprising:
a hydraulic circuit having, arranged in series and in serial order along a primary flow path, a hydraulic pump, a pressure-dump valve and a hydraulic application;
wherein said pressure-dump valve includes a valve body and a valve member, said valve body defining a valve chamber, said valve chamber defining an axis wherein said valve member is axially slidable within said chamber between a first axial position and a second axial position and partitions said chamber into a primary flow channel and a secondary volume, said valve member further defining a pressure-reducing orifice providing fluid communication between said primary flow channel and said secondary volume; said valve body further defining an inlet port in fluid communication with said primary flow channel, an outlet port in fluid communication with said primary flow channel, a secondary volume port in fluid communication with said secondary volume, and a bypass port, said bypass port being disposed at an axially intermediate position with said secondary volume port being disposed on one axial side of said bypass port and said inlet port and said outlet port being disposed on the opposing axial side of said bypass port, said bypass port being sealed from fluid communication with said valve chamber when said valve member is in said first axial position and said bypass port being in fluid communication with said primary flow channel when said valve member is in said second axial position, said pressure-dump valve operably disposed in said hydraulic circuit wherein said primary flow path extends to said inlet port, through said primary flow channel and said outlet port to said hydraulic application; said bypass port being in fluid communication with said primary flow path at a point downstream of said hydraulic application and upstream of said pump;

a biasing member operably coupled with said valve member and biasing said valve member toward said first position;

and a one-way check valve operably disposed in said hydraulic circuit between said secondary volume port and said primary flow path at a location downstream of said hydraulic application and upstream of said pump said check valve allowing fluid flow from said secondary volume port to said primary flow channel when a pressure in said primary flow channel communicated to said secondary volume through said pressure-reducing orifice exceeds a threshold pressure value and wherein, when said check valve permits fluid flow therethrough, fluid flowing from said primary flow channel to said secondary volume through said pressure-reducing orifice experiences a reduction in pressure thereby producing a pressure differential between said secondary volume and said primary flow channel, said pressure differential biasing said valve member from said first axial position to said second axial position and wherein, when said check valve closes and terminates fluid flow therethrough, said pressure differential decreases and said biasing member biases said valve member to said first axial position; and wherein said hydraulic application is a hydraulic steering gear device.

2. A vehicular hydraulic system comprising:

a hydraulic circuit having, arranged in series and in serial order along a primary flow path, a hydraulic pump, a pressure-dump valve and a hydraulic application;

wherein said pressure-dump valve includes a valve body and a valve member, said valve body defining a valve chamber, said valve chamber defining an axis wherein said valve member is axially slidable within said chamber between a first axial position and a second axial position and partitions said chamber into a primary flow channel and a secondary volume, said valve member further defining a pressure-reducing orifice providing fluid communication between said primary flow channel and said secondary volume; said valve body further defining an inlet port in fluid communication with said primary flow channel, an outlet port in fluid communication with said primary flow channel, a secondary volume port in fluid communication with said secondary volume, and a bypass port, said bypass port being disposed at an axially intermediate position with said secondary volume port being disposed on one axial side of said bypass port and said inlet port and said outlet port being disposed on the opposing axial side of said bypass port, said bypass port being sealed from fluid communication with said valve chamber when said valve member is in said first axial position and said bypass port being in fluid communication with said primary flow channel when said valve member is in said second axial position, said pressure-dump valve operably disposed in said hydraulic circuit wherein said primary flow path extends to said inlet port, through said primary flow channel and said outlet port to said hydraulic application; said bypass port being in fluid communication with said primary flow path at a point downstream of said hydraulic application and upstream of said pump;

a biasing member operably coupled with said valve member and biasing said valve member toward said first position;

and a one-way check valve operably disposed in said hydraulic circuit between said secondary volume port and said primary flow path at a location downstream of said hydraulic application and upstream of said pump; said check valve allowing fluid flow from said secondary volume port to said primary flow channel when a pressure in said primary flow channel communicated to said secondary volume through said pressure-reducing orifice exceeds a threshold pressure value and wherein, when said check valve permits fluid flow therethrough, fluid flowing from said primary flow channel to said secondary volume through said pressure-reducing orifice experiences a reduction in pressure thereby producing a pressure differential between said secondary volume and said primary flow channel, said pressure differential biasing said valve member from said first axial position to said second axial position; and wherein, when said check valve closes and terminates fluid flow therethrough, said pressure differential decreases and said biasing member biases said valve member to said first axial position; and a first hydraulic application, said first hydraulic application operably disposed in said hydraulic circuit downstream of said pump and upstream of said pressure dump valve.

3. A vehicular hydraulic system comprising:

a hydraulic circuit having, arranged in series and in serial order along a primary flow path, a hydraulic pump, a flow-splitting valve, a first hydraulic application, a pressure-dump valve and a second hydraulic application;

wherein, in a first operating condition, substantially all of the hydraulic fluid discharged from said pump is circulated along said primary flow path through said flow-splitting valve to said first hydraulic application; and, when the fluid in said primary flow path upstream of said first hydraulic application is elevated to a first threshold value, said flow-splitting valve splits the hydraulic fluid discharged by said pump into a first fluid flow which is communicated to said primary flow path upstream of said first hydraulic application and a second fluid flow which is communicated to a point in said primary flow path downstream of said first hydraulic application and upstream of said pressure-dump valve;

wherein said pressure-dump valve has a valve body and a valve member, said valve body defining a valve chamber, said valve chamber defining an axis wherein said valve member is axially slidable within said chamber between a first axial position and a second axial position and partitions said chamber into a primary flow channel and a secondary volume, said valve member further defining a pressure-reducing orifice providing fluid communication between said primary flow channel and said secondary volume; said valve body further defining an inlet port in fluid communication with said primary flow channel, an outlet port in fluid communication with said primary flow channel, a secondary volume port in fluid communication with said secondary volume, and a bypass port, said bypass port being disposed at an axially intermediate position with said secondary volume port being disposed on one axial side of said bypass port and said inlet port and said outlet port being disposed on the opposing axial side of said bypass port, said bypass port being sealed from fluid communication with said valve chamber when said valve member is in said first axial position and said bypass port being in fluid communication with said primary flow channel when said valve member is in said second axial position, said pressure-dump valve operably disposed in said hydraulic circuit downstream of said first hydraulic application and upstream of said second hydraulic application wherein said primary flow path extends from said first hydraulic application to said inlet port, through said primary flow channel and said outlet port to said second hydraulic application; said bypass port being in fluid communication with said primary flow path at a point downstream of said second hydraulic application and upstream of said pump;

a biasing member operably coupled with said valve member and biasing said valve member toward said first position;

and a one-way check valve operably disposed in said hydraulic circuit between said secondary volume port and said primary flow path at a location downstream of said second hydraulic application and upstream of said pump;

said check valve allowing fluid flow from said secondary volume port to said primary flow channel when a pressure in said primary flow channel communicated to said secondary volume through said pressure-reducing orifice exceeds a second threshold pressure value and wherein, when said check valve permits fluid flow therethrough, fluid flowing from said primary flow channel to said secondary volume through said pressure-reducing orifice experiences a reduction in pressure thereby producing a pressure differential between said secondary volume and said primary flow channel, said pressure differential biasing said valve member from said first axial position to said second axial position;

and wherein, when said check valve closes and terminates fluid flow therethrough, said pressure differential decreases and said biasing member biases said valve member to said first axial position, and wherein said first threshold pressure value is greater than said second threshold pressure value.

4. The vehicular hydraulic system of claim 3 wherein said first hydraulic application is a hydraulic brake booster device and said second hydraulic application is a hydraulic steering gear device.

5. The vehicular hydraulic system of claim 3 wherein said check valve defines a selectively variable resistance to opening of said check valve to fluid flow therethrough whereby said threshold pressure value defined by said check valve is adjustable.

6. The vehicular hydraulic system of claim 5 wherein external adjustment of said check valve selectively varies said resistance.

7. The vehicular hydraulic system of claim 3 wherein said one-way check valve comprises:

a second valve member operably disposed within said check valve and moveable between a first position wherein said second valve member prevents fluid flow through said check valve and a second position wherein said second valve member allows fluid flow through said check valve;

a second biasing member biasing said second valve member towards said first position;

and a threaded member operably coupled with said biasing member, said threaded member being externally repositionable wherein repositioning of said threaded member varies said threshold value.

8. The vehicular hydraulic system of claim 3 further comprising a hydraulic reservoir operably disposed in said hydraulic circuit downstream of said second hydraulic application and upstream of said pump and wherein said one-way check valve is in fluid communication with said primary flow channel at a location upstream of the location where said bypass port is in fluid communication with said primary flow channel.

9. The vehicular hydraulic system of claim 3 wherein said one-way check valve is disposed in a fluid line extending from said secondary volume port to said primary flow channel, said check valve being spaced from said pressure-dump valve by a portion of said fluid line.

10. A vehicular hydraulic system comprising: a hydraulic circuit having, arranged in series and in serial order along a primary flow path, a hydraulic pump, a flow-splitting valve, a first hydraulic application, a pressure-dump valve and a second hydraulic application;

wherein, in a first operating condition, substantially all of the hydraulic fluid discharged from said pump is circulated along said primary flow path through said flow-splitting valve to said first hydraulic application; and, when the fluid in said primary flow path upstream of said first hydraulic application is elevated to a first threshold value, said flow-splitting valve splits the hydraulic fluid discharged by said pump into a first fluid flow which is communicated to said primary flow path upstream of said first hydraulic application and a second fluid flow which is communicated to a point in said primary flow path downstream of said first hydraulic application and upstream of said pressure-dump valve;

wherein said pressure-dump valve has a valve body and a valve member, said valve body defining a valve chamber, said valve chamber defining an axis wherein said valve member is axially slidable within said chamber between a first axial position and a second axial position and partitions said chamber into a primary flow channel and a secondary volume, said valve member further defining a pressure-reducing orifice providing fluid communication between said primary flow channel and said secondary volume; said valve body further defining an inlet port in fluid communication with said primary flow channel, an outlet port in fluid communication with said primary flow channel, a secondary volume port in fluid communication with said secondary volume, and a bypass port, said bypass port being disposed at an axially intermediate position with said secondary volume port being disposed on one axial side of said bypass port and said inlet port and said outlet port being disposed on the opposing axial side of said bypass port, said bypass port being sealed from fluid communication with said valve chamber when said valve member is in said first axial position and said bypass port being in fluid communication with said primary flow channel when said valve member is in said second axial position, said pressure-dump valve operably disposed in said hydraulic circuit downstream of said first hydraulic application and upstream of said second hydraulic application wherein said primary flow path extends from said first hydraulic application to said inlet port, through said primary flow channel and said outlet port to said second hydraulic application; said bypass port being in fluid communication with said primary flow path at a point downstream of said second hydraulic application and upstream of said pump;

a biasing member operably coupled with said valve member and biasing said valve member toward said first position;

and a one-way check valve operably disposed in said hydraulic circuit between said secondary volume port and said primary flow path at a location downstream of said second hydraulic application and upstream of said pump;

said check valve allowing fluid flow from said secondary volume port to said primary flow channel when a pressure in said primary flow channel communicated to said secondary volume through said pressure-reducing orifice exceeds a second threshold pressure value and wherein, when said check valve permits fluid flow therethrough, fluid flowing from said primary flow channel to said secondary volume through said pressure-reducing orifice experiences a reduction in pressure thereby producing a pressure differential between said secondary volume and said primary flow channel, said pressure differential biasing said valve member from said first axial position to said second axial position;

and wherein, when said check valve closes and terminates fluid flow therethrough, said pressure differential decreases and said biasing member biases said valve member to said first axial position, and wherein said check valve defines a selectively variable resistance to opening of said check valve to fluid flow therethrough whereby said second threshold pressure value is adjustable.

11. The vehicular hydraulic system of claim 10 wherein said first hydraulic application is a hydraulic brake booster device and said second hydraulic application is a hydraulic steering gear device.

12. The vehicular hydraulic system of claim 10 wherein external adjustment of said check valve selectively varies said resistance.

13. The vehicular hydraulic system of claim 10 wherein said one-way check valve comprises:

a second valve member operably disposed within said check valve and moveable between a first position wherein said second valve member prevents fluid flow through said check valve and a second position wherein said second valve member allows fluid flow through said check valve;

a second biasing member biasing said second valve member towards said first position;

and a threaded member operably coupled with said biasing member, said threaded member being externally repositionable wherein repositioning of said threaded member varies said threshold value.

14. The vehicular hydraulic system of claim 10 further comprising a hydraulic reservoir operably disposed in said hydraulic circuit downstream of said second hydraulic application and upstream of said pump and wherein said one-way check valve is in fluid communication with said primary flow channel at a location upstream of the location where said bypass port is in fluid communication with said primary flow channel.

15. The vehicular hydraulic system of claim 10 wherein said one-way check valve is disposed in a fluid line extending from said secondary volume port to said primary flow channel, said check valve being spaced from said pressure-dump valve by a portion of said fluid line.

16. A vehicular hydraulic system comprising:

a hydraulic circuit having, arranged in series and in serial order along a primary flow path, a hydraulic pump, a flow-splitting valve, a first hydraulic application, a pressure-dump valve and a second hydraulic application;

wherein said flow-splitting valve communicates substantially all hydraulic fluid flowing therethrough to said primary flow path at a point upstream of said first hydraulic application when the pressure of the hydraulic fluid flowing therethrough is below a first threshold pressure value; said flow-splitting valve splitting the hydraulic fluid flow therethrough into a first fluid flow which is communicated to said primary fluid path upstream of said first hydraulic application and a second fluid flow which is communicated to said primary fluid path at a point downstream of said first hydraulic application and upstream of said pressure-dump valve when the pressure of the hydraulic fluid flowing through said flow-splitting valve exceeds said first threshold value;

wherein said pressure-dump valve communicates substantially all hydraulic fluid flowing therethrough to said primary flow path at a point upstream of said second hydraulic application when the pressure of the hydraulic fluid flowing therethrough is below a second threshold pressure value; said pressure-dump valve splitting the hydraulic fluid flow therethrough into a third fluid flow which is communicated to said primary fluid path upstream of said second hydraulic application and a fourth fluid flow which is communicated to said primary fluid path at a point downstream of said second hydraulic application and upstream of said pump when the pressure of the hydraulic fluid flowing through said pressure-dump valve exceeds said second threshold value; and wherein said first threshold value is greater than said second threshold value.

17. The vehicular hydraulic system of claim 16, wherein said first hydraulic application is a hydraulic brake booster device.

18. The vehicular hydraulic system of claim 16, wherein said second hydraulic application is a hydraulic steering gear device.

19. The vehicular hydraulic system of claim 16, wherein said first hydraulic application is a hydraulic brake booster device and said second hydraulic application is a hydraulic steering gear device.

\* \* \* \* \*